(12) United States Patent
Wang

(10) Patent No.: US 12,466,444 B2
(45) Date of Patent: Nov. 11, 2025

(54) TECHNIQUES FOR SWITCHING BETWEEN MANUAL AND AUTONOMOUS CONTROL FOR A MOVABLE OBJECT

(71) Applicant: SHENZHEN ZHUOYU TECHNOLOGY CO., LTD., Guangdong (CN)

(72) Inventor: Mingyu Wang, Guangdong (CN)

(73) Assignee: SHENZHEN ZHUOYU TECHNOLOGY CO., LTD., Shenzhen (CN)

( * ) Notice: Subject to any disclaimer, the term of this patent is extended or adjusted under 35 U.S.C. 154(b) by 682 days.

(21) Appl. No.: 17/097,316

(22) Filed: Nov. 13, 2020

(65) Prior Publication Data

US 2021/0061312 A1 Mar. 4, 2021

Related U.S. Application Data

(63) Continuation of application No. PCT/CN2019/077510, filed on Mar. 8, 2019.

(51) Int. Cl.
*B60W 50/14* (2020.01)
*B60W 50/08* (2020.01)
(Continued)

(52) U.S. Cl.
CPC ...... *B60W 60/0051* (2020.02); *B60W 50/082* (2013.01); *B60W 50/14* (2013.01);
(Continued)

(58) Field of Classification Search
CPC ........... B60W 50/082; B60W 60/0015; B60W 50/14; B60W 2050/0071; B60W 2556/45
See application file for complete search history.

(56) References Cited

U.S. PATENT DOCUMENTS 10,101,743 B2 * 10/2018 Abe .................. G05D 1/0088
10,528,044 B2 * 1/2020 Emura ............... G05D 1/0061
(Continued)

FOREIGN PATENT DOCUMENTS

CN 102053619 A 5/2011
CN 102395499 A 3/2012
(Continued)

OTHER PUBLICATIONS

Chinese Office Action issued Jun. 16, 2023, in corresponding Chinese Patent Application No. 201980005612.0.
(Continued)

*Primary Examiner* — Shelley Chen

(57) ABSTRACT

Techniques are disclosed for switching between a manual driving mode and an autonomous driving mode. A system for switching driving modes can include a vehicle control unit in communication with a plurality of sensors and a plurality of vehicle controls of an autonomous vehicle. The vehicle control unit can include a control manager configured to receive a request to switch driving modes from a first mode to a second mode, obtain a driving state using the plurality of sensors, determine the driving state meets a switching standard, enter a pending switching state in which a control input received for the first mode is combined with a control input received for the second mode to generate a vehicle control output, send a message indicating that the driving mode is to switch from the first mode to the second mode, and switch driving modes from the first mode to the second mode.

20 Claims, 11 Drawing Sheets

(51) Int. Cl.
*B60W 60/00* (2020.01)
*B60W 50/00* (2006.01)

(52) U.S. Cl.
CPC .. *B60W 60/0015* (2020.02); *B60W 2050/0071* (2013.01); *B60W 2050/143* (2013.01); *B60W 2556/45* (2020.02)

(56) References Cited

U.S. PATENT DOCUMENTS

| | | | |
|---|---|---|---|
| 10,787,192 B1* | 9/2020 | Katzourakis | B62D 5/0487 |
| 2012/0046817 A1 | 2/2012 | Kindo et al. | |
| 2015/0345819 A1 | 12/2015 | Ostrovsky et al. | |
| 2016/0209840 A1* | 7/2016 | Kim | B60W 60/0059 |
| 2017/0261983 A1* | 9/2017 | Abe | G05D 1/0212 |
| 2017/0305425 A1 | 10/2017 | Xing | |
| 2018/0113454 A1* | 4/2018 | Emura | B60W 50/14 |
| 2018/0186376 A1 | 7/2018 | Lee et al. | |
| 2019/0011914 A1* | 1/2019 | Park | B60W 40/09 |
| 2019/0126925 A1* | 5/2019 | Ryne | B60W 60/0053 |
| 2019/0161116 A1* | 5/2019 | Moreillon | B62D 15/025 |
| 2019/0291745 A1* | 9/2019 | Sikorski | B60W 50/14 |
| 2020/0282984 A1* | 9/2020 | Mizoguchi | B60W 50/14 |
| 2021/0061299 A1* | 3/2021 | Wang | B60K 35/29 |

FOREIGN PATENT DOCUMENTS

| | | | | |
|---|---|---|---|---|
| CN | 102945046 A | | 2/2013 | |
| CN | 104331085 A | | 2/2015 | |
| CN | 107187449 A | | 9/2017 | |
| CN | 107635844 A | | 1/2018 | |
| CN | 108137062 A | * | 6/2018 | ............ B60W 40/08 |
| CN | 108140324 A | * | 6/2018 | ............ B60K 28/02 |
| CN | 109204325 A | | 1/2019 | |
| DE | 102017004845 A1 | * | 12/2017 | |
| EP | 3045369 A1 | * | 7/2016 | .......... B60W 30/182 |
| JP | 2019-040588 A | | 3/2019 | |

OTHER PUBLICATIONS

"Steam Turbine Digital Electro-hydraulic Regulating System", Xiao Zenghong et al., China Electric Power Press, p. 209, Apr. 2003.
Office Action, CN App. No. 201980005612.0, Sep. 14, 2022, 17 pages of Original Document Only.
International Search Report and Written Opinion for related International Application No. PCT/CN2019/077510, mailed Dec. 13, 2019, 10 pages.

* cited by examiner

PENDING SWITCHING STATE 400

SAFE MODE 402

TECHNIQUES FOR SWITCHING BETWEEN MANUAL AND AUTONOMOUS CONTROL FOR A MOVABLE OBJECT

CROSS REFERENCE TO RELATED APPLICATION

This application is related to International Application PCT/CN2019/077510, filed Mar. 8, 2019, entitled, "TECHNIQUES FOR SWITCHING BETWEEN MANUAL AND AUTONOMOUS CONTROL FOR A MOVABLE OBJECT which is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The disclosed embodiments relate generally to techniques for controlling a movable object and more particularly, but not exclusively, to techniques for switching between manual and autonomous control of a movable object.

BACKGROUND

Self-driving vehicles, also referred to as autonomous vehicles, utilize various sensors mounted on the self-driving vehicle to obtain information about their environment and make driving decisions, without relying on a driver for input. These sensors may include a camera (visual sensor), LiDAR, millimeter wave radar, ultrasound sensor and so on. The vehicle can analyze the sensor data to recognize the driving environment, and perform various driving tasks, such as lane detection, pedestrian detection, vehicle detection, identify driving routes, etc. The autonomous vehicle can use the information detected about the driving environment to decide how to proceed. For example, a macro-control decision is made based on high precision map positioning, a full/partial route can be planned, and various real-time driving decisions can be made based on the real-time driving environment. making are realized through computing the merged information from various sensors. The autonomous vehicle can then control the drive system of the autonomous vehicle to effect the driving decisions and cause the autonomous vehicle to travel the planned route.

SUMMARY

Techniques are disclosed for switching between a manual driving mode and an autonomous driving mode. A system for switching driving modes can include a vehicle control unit in communication with a plurality of sensors and a plurality of vehicle controls of an autonomous vehicle. The vehicle control unit can include a control manager configured to receive a request to switch driving modes from a first mode to a second mode, obtain a driving state using the plurality of sensors, determine the driving state meets a switching standard, enter a pending switching state in which a control input received for the first mode is combined with a control input received for the second mode to generate a vehicle control output, send a message indicating that the driving mode is to switch from the first mode to the second mode, and switch driving modes from the first mode to the second mode.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The following description of the invention describes target mapping using a movable object. For simplicity of explanation, an unmanned aerial vehicle (UAV) is generally used as example of a movable object. It will be apparent to those skilled in the art that other types of movable objects can be used without limitation.

Some autonomous vehicles are full-time self-driving, i.e., they only support autonomous driving, and may not provide a driving seat or driver-accessible controls. Some of the autonomous vehicles can be temporary controlled by the driver, but under most circumstances the vehicle will drive autonomously.

Embodiments provide switching strategies for managing changeover from a manual driving mode to an autonomous driving mode, as well as for managing changeover from an autonomous driving mode to a manual driving mode, so as to improve the driving and riding experiences.

Figure 1:
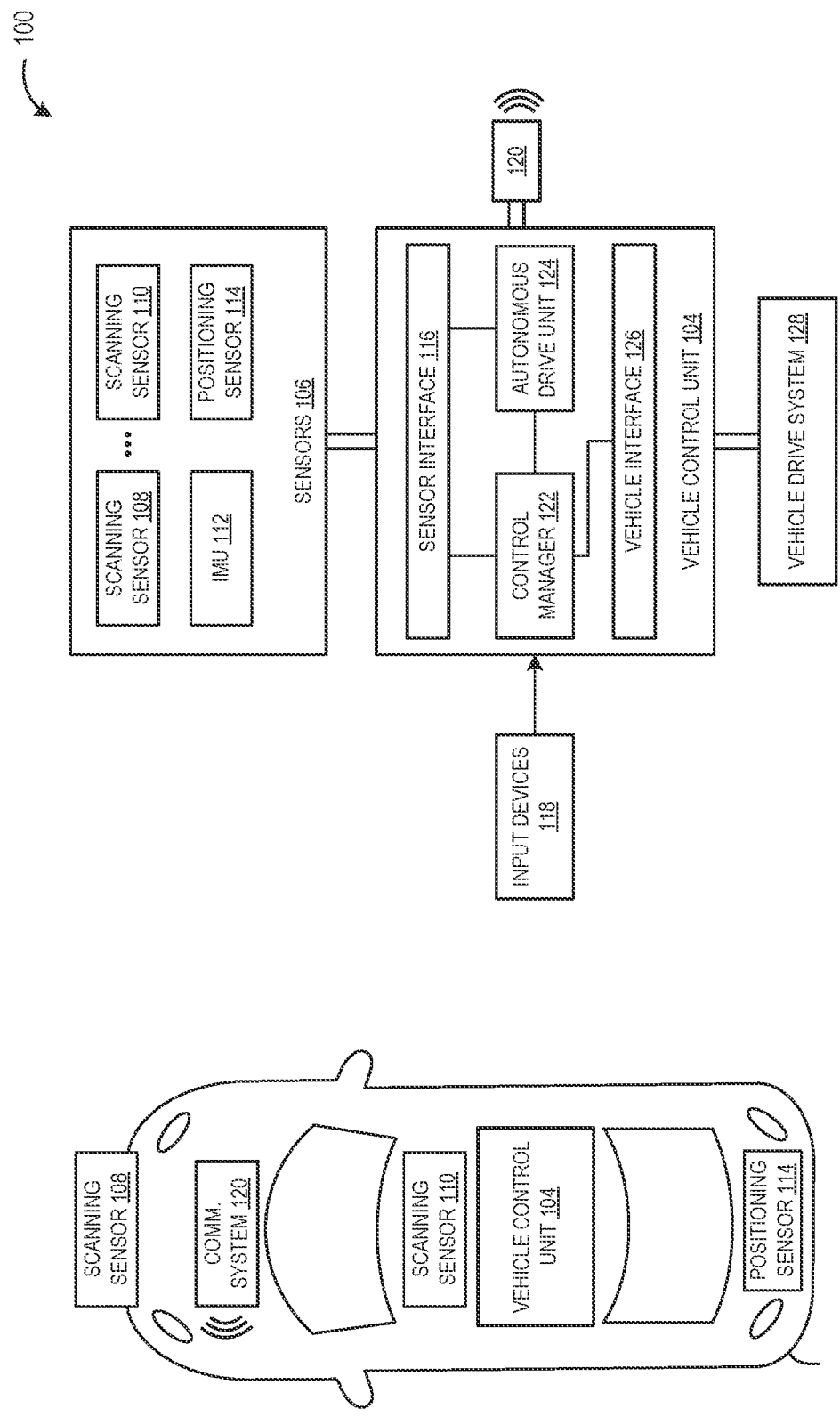
FIG. 1 illustrates an example of a movable object in a movable object environment, in accordance with various embodiments of the present invention.

FIG. 1 illustrates an example of a movable object in a movable object environment 100, in accordance with various embodiments of the present invention. As shown in FIG. 1, a movable object can be an unmanned aircraft, an unmanned vehicle, a handheld device, and/or a robot. Although the movable object 102 is described generally as a ground vehicle, this is not intended to be limiting, and any suitable type of movable object can be used. One of skill in the art would appreciate that any of the embodiments described herein can be applied to any suitable movable object (e.g., an autonomous vehicle, an unmanned aerial vehicle (UAV), etc.). As used herein, "aerial vehicle" may be used to refer to a subset of movable objects capable of flight (e.g., aircraft, UAVs, etc.), while "ground vehicle" may be used to refer to a subset of movable objects that travel on the ground (e.g., cars and trucks, both manually controlled by a driver and autonomously controlled).

Movable object 102 may include a vehicle control unit and various sensors 106, such as scanning sensors 108 and 110, inertial measurement unit (IMU) 112, and positioning sensor 114. In some embodiments, scanning sensors 108, 110 can include a LiDAR sensor, ultrasonic sensor, infrared sensor, radar sensor, imaging sensor, or other sensor operable to collect information about the surroundings of the movable object, such as distances to other objects in the surroundings relative to the movable object. The movable object 102 can include a communication system 120, which is responsible for handling the communication between the movable object 102 and other movable objects, a client device, and the movable object 102 via communication system 120B. For example, an unmanned aircraft can include uplink and downlink communication paths. The uplink can be used for transmitting control signals, the downlink can be used for transmitting media, video stream, control instructions for another device, etc. In some embodiments, the movable object can communicate with a client device. The client device can be a portable personal computing device, a smart phone, a remote control, a wearable computer, a virtual reality/augmented reality system, and/or a personal computer. The client device may provide control instructions to the movable object and/or receive data from the movable object, such as image or video data.

In accordance with various embodiments of the present invention, the communication system can communicate using a network, which is based on various wireless technologies, such as the WiFi, Bluetooth, 3G/4G/5G, and other radio frequency technologies. Furthermore, the communication system 120 can communicate using a communication link based on other computer network technologies, such as internet technology (e.g., TCP/IP, HTTP, HTTPS, HTTP/2, or other protocol), or any other wired or wireless networking technology. In some embodiments, the communication link used by communication system 120 may be a non-network technology, including direct point-to-point connections such as universal serial bus (USB) or universal asynchronous receiver-transmitter (UART).

In accordance with various embodiments of the present invention, the movable object 102 may include a vehicle drive system 128. The vehicle drive system 128 can include various movement mechanisms, such as one or more of rotors, propellers, blades, engines, motors, wheels, axles, magnets, nozzles, animals, or human beings. For example, the movable object may have one or more propulsion mechanisms. The movement mechanisms may all be of the same type. Alternatively, the movement mechanisms can be different types of movement mechanisms. The movement mechanisms can be mounted on the movable object 102 (or vice-versa), using any suitable means such as a support element (e.g., a drive shaft). The movement mechanisms can be mounted on any suitable portion of the movable object 102, such on the top, bottom, front, back, sides, or suitable combinations thereof.

In some embodiments, one or more of the movement mechanisms may be controlled independently of the other movement mechanisms, for example by an application executing on a client device, vehicle control unit 104, or other computing device in communication with the movement mechanisms. Alternatively, the movement mechanisms can be configured to be controlled simultaneously. For example, the movable object 102 can be a front or rear wheel drive vehicle in which the front or rear wheels are controlled simultaneously. Vehicle control unit 104 can send movement commands to the movement mechanisms to control the movement of movable object 102. These movement commands may be based on and/or derived from instructions received from a client device, autonomous drive unit 124, input device 118 (e.g., built in vehicle controls, such as an accelerator pedal, brake pedal, steering wheel, etc.), or other entity.

The movable object 102 can include a plurality of sensors 106. The sensors 106 can include one or more sensors that may sense the spatial disposition, velocity, and/or acceleration of the movable object 102 (e.g., with respect to various degrees of translation and various degrees of rotation). The one or more sensors can include various sensors, including global navigation satellite service (GNSS) sensors (e.g., global positioning system (GPS), BeiDou, Galileo, etc.), motion sensors, inertial sensors, proximity sensors, or image sensors. The sensing data provided by the sensors 106 can be used to control the spatial disposition, velocity, and/or orientation of the movable object 102 (e.g., using a suitable processing unit and/or control module, such as vehicle control unit 104). Additionally, or alternatively, the sensors can be used to provide data regarding the environment surrounding the movable object, such as weather conditions, proximity to potential obstacles, location of geographical features, location of manmade structures, and the like. In some embodiments, one or more of the sensors 106 may be coupled to the movable object 102 via a carrier. The carrier may enable the sensor to move independently of the movable object. For example, an image sensor may be oriented to capture images around the movable object using the carrier to change the image sensor's orientation. This enables images to be captured in various directions independent of the current orientation of the movable object. In some embodiments, the sensor mounted to the carrier may be referred to as a payload.

The communication system 120 may include any number of transmitters, receivers, and/or transceivers suitable for wireless communication. The communication may be one-way communication, such that data can be transmitted in only one direction. For example, one-way communication may involve only the movable object 102 transmitting data to the client device 110, or vice-versa. The data may be transmitted from one or more transmitters of the communication system 120A of the client device to one or more receivers of the communication system 120B of the movable object, or vice-versa. Alternatively, the communication may be two-way communication, such that data can be transmitted in both directions between the movable object 102 and the client device 110. The two-way communication can involve transmitting data from one or more transmitters of the communication system 120B to one or more receivers of the communication system 120A of the client device 110, and vice-versa.

In some embodiments, an application executing on vehicle control unit 104, a client device, or a computing device in communication with the movable object can provide control data to one or more of the movable object 102, carrier, or one or more sensors 106, and receive information from one or more of the movable object 102, carrier, or sensors 106 (e.g., position and/or motion information of the movable object, carrier or payload; data sensed by the payload such as image data captured by a payload camera; and data generated from image data captured by the payload camera).

In some embodiments, the control data may result in a modification of the location and/or orientation of the movable object 102 (e.g., via control of the movement mechanisms), or a movement of the payload with respect to the movable object (e.g., via control of the carrier). The control data from the application may result in control of the payload, such as control of the operation of scanning sensor 124, a camera or other image capturing device (e.g., taking still or moving pictures, zooming in or out, turning on or off, switching imaging modes, change image resolution, changing focus, changing depth of field, changing exposure time, changing viewing angle or field of view).

In some instances, the communications from the movable object, carrier and/or payload may include information from one or more sensors 106 and/or data generated based on the sensing information. The communications may include sensed information from one or more different types of sensors 106 (e.g., GNSS sensors, motion sensors, inertial sensor, proximity sensors, or image sensors). Such information may pertain to the position (e.g., location, orientation), movement, or acceleration of the movable object, carrier, and/or payload. Such information from a payload may include data captured by the payload or a sensed state of the payload.

In some embodiments, vehicle control unit 104 can be implemented on a computing device that can be added to the movable object 102. The computing device can be powered by the movable object and can include one or more processors, such as CPUs, GPUs, field programmable gate arrays (FPGAs), system on chip (SoC), application-specific integrated circuit (ASIC), or other processors. The computing device can include an operating system (OS), such as Windows 10®, Linux®, Unix®-based operating systems, or other OS. In various embodiments, the control manager 122 can execute on the computing device, a client device, a payload device, a remote server (not shown), or other computing device.

In various embodiments, autonomous drive unit 124 can provide one or more levels of autonomous control over movable object 102. For example, the Society of Automotive Engineers defines six levels of autonomous driving, ranging from L0, in which the vehicle is driven manually but some warnings or notifications related to the roadway environment, driving conditions, etc., to L5, which is fully automatic driving and no input from a driver is required. When driven in L0, the movable object 102 can be controlled by a driving using input devices 118. The input devices may include various vehicle control mechanisms, such as brake and accelerator pedals, steering wheel, gear shift, clutch pedal, touchscreen, switches/toggles/buttons, a microphone through which to receive voice commands, a camera to monitor the driver (e.g., gaze detection, physical gestures, posture, etc.), a client device (e.g., a portable computing device such as a tablet computer, smartphone, laptop, remote control, or other computing device), etc. These control mechanisms may be mechanically operated by the driver and may each produce a signal that is sent to control manager 122. For example, a steering signal may indicate how far to the left or right the steering wheel is turned from a neutral position and/or the torque applied to the steering wheel and control manager 122 can convert the steering signal into a control instruction that can be passed via vehicle interface 126 to the vehicle drive system 128 (for example, the control instruction may cause an electric motor coupled to the movable object's steering system to rotate one or more of the movable object's road wheels to a degree based on the steering signal).

In manual mode (e.g., L0), the control manager may not receive any inputs from autonomous drive unit 124, or if any inputs are received it may ignore them. As a result, the movable object is driven based on the manual inputs received from input devices 118. In fully autonomous mode (e.g., L5), any inputs received from input devices 118 may be ignored by control manager 122 and the movable object is driven based on the autonomous inputs received from the autonomous drive unit 124. The autonomous drive unit 124 may base its control instructions on sensor data received by sensors 106 via sensor interface 116. In various embodiments, the autonomous inputs received from the autonomous drive unit 124 may be converted by the control manager 122 into control instructions and passes to the vehicle drive system 128, similar to that described above with respect to manual inputs. In some embodiments, the autonomous inputs received from autonomous drive unit 124 may be control instructions that can be natively processed by the vehicle drive system and may be passed by the control manager 122 unmodified or may be directly communicated by the autonomous drive unit 124 to the vehicle drive system 128 via vehicle interface 126.

In some embodiments, the vehicle control unit 104 can connect to the sensors 106 via a high bandwidth connection, such as ethernet or universal serial bus (USB), or over a low bandwidth connection, such as universal asynchronous receiver-transmitter (UART), depending on the type of sensor. In various embodiments, the vehicle drive unit 104 may be removable from the movable object.

The control manager 122 can determine when the movable object is to switch between driving modes based on, e.g., sensor data received from sensors 106, input received via input devices 118 or input received from autonomous drive unit 124. The control manager 122 can determine whether the switch the driving modes as requested based on a current driving state. The current driving state can be obtained from, or based on data received from, sensors 106. The driving state may indicate, e.g., the current speed, position, heading, etc. of the vehicle, and may also indicate information about the current roadway environment in which the vehicle is operated, such as current traffic conditions, weather conditions, terrain, roadway type, location details, etc. In some embodiments, the driving state may further include driver state, such as driver fatigue and readiness. Examples of driver state may include whether the driver is in the driver's seat and the position of the driver's seat (e.g., is it upright), is the driver's seatbelt fastened, etc. If the control manager 122 determines that the current driving state allows for the driving mode to be switched, then the vehicle may be placed in a pending switching state where control is transitioned between the driver and the autonomous drive unit. In the pending switching state, the inputs received from the driver and the autonomous drive unit may be combined by the control manager to determine the control instructions passed to the vehicle drive system 128. Use of the pending switching state as a transition mode prevents the control manager from oscillating back and forth between the manual mode and the autonomous mode based on driving state and enables a smooth and safe transition from one state to another. Once the vehicle has completely transitioned between modes, an indication can be provided to the driver indicating that the driving mode has been changed.

Figure 2:
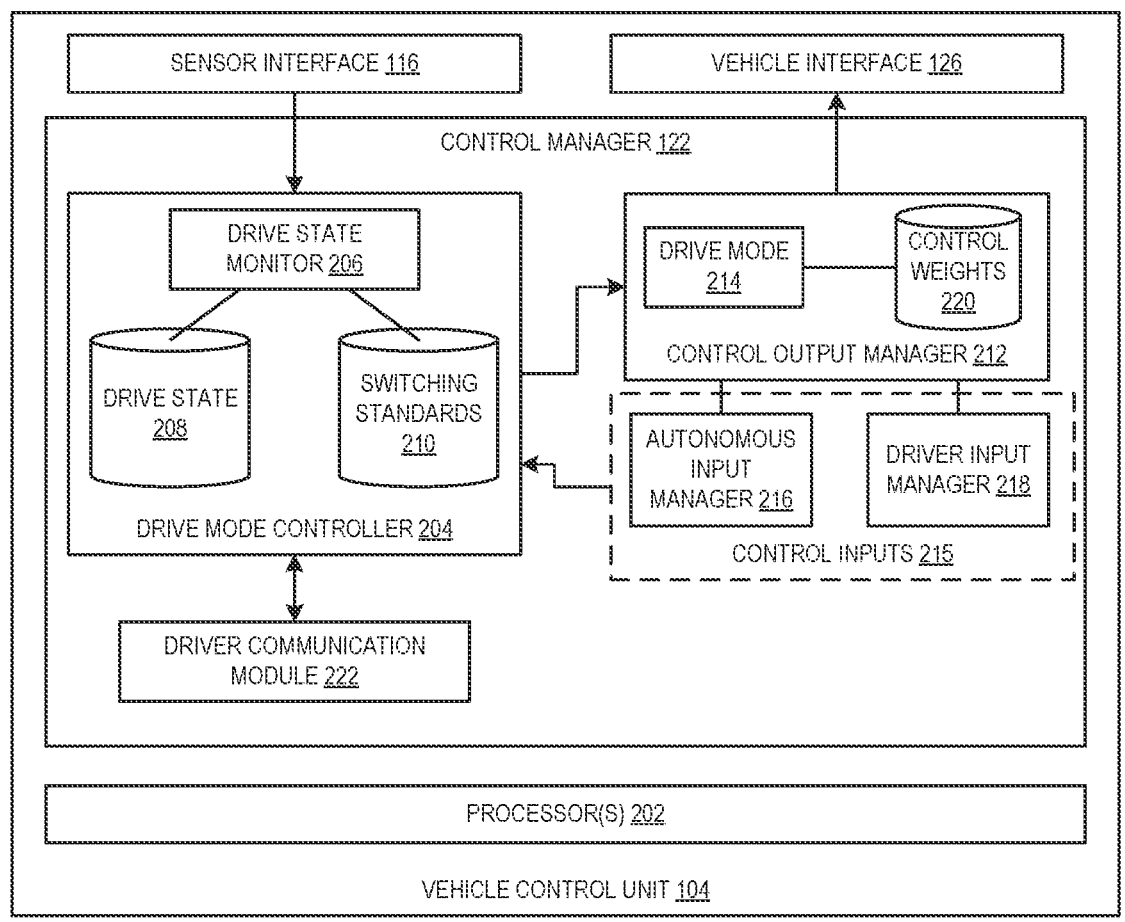
FIG. 2 illustrates an example of a vehicle control unit in a movable object environment, in accordance with various embodiments of the present invention.

FIG. 2 illustrates an example 200 of a vehicle control unit in a movable object environment, in accordance with various embodiments of the present invention. As shown in FIG. 2, a control manager 122 may execute on one or more processors 202 of vehicle control unit 104. The one or more processors 202 may include CPUs, GPUs, GPGPUs, FGPAs, SoCs, or other processors, and may be part of a parallel computing architecture implemented by vehicle control unit 104. The control manager 202 may receive sensor data via sensor interface 116 and send control instructions to the vehicle via vehicle interface 126. The control manager can include a drive mode controller 204, control output manager 212, and driver communication module 222. The drive mode controller can include a drive state monitor 206 and may store driving state data and one or more switching standards 210. The control output manager 212 can include a current drive mode 214 set by drive mode controller 204 and one or more sets of control weights 220. In some embodiments, the control weights in use by the control output manager 212 may vary depending on the current drive mode 214.

As shown in FIG. 2, drive mode controller can monitor the current driving state of the movable object 102 using a drive state monitor 206. Drive state monitor can obtain sensor data from sensors 106 via sensor interface 116. In some embodiments, the drive state monitor 206 can poll the sensors at regular intervals for sensor data updates. In some embodiments, one or more of the sensors 106 can push sensor data updates to the drive state monitor. The drive state monitor can use the sensor data to generate a current driving state, which may be stored in drive state data store 208. The driving state may indicate one or more of a current position, speed, acceleration, environmental information, driving information, or traffic information. For example, the driving state may indicate a number of vehicles within a threshold distance of the movable object and their current speed and/or direction of travel. The environmental information may include, e.g., current weather data (obtained from a weather service via communication system 120 or based on sensor data). Driving information may include how long the car has been driven since its last stop, average speed, fuel consumption, current driving mode (e.g., L0-L5), etc.

In some embodiments, drive state data store 208 may maintain a rolling window of driving states. For example, the driving state may be recorded every millisecond (or other frequency) by drive state monitor 206 and drive state data store 208 may maintain five minutes' (or other length of time) worth of driving states. When a request is received to change driving mode from control inputs 215, the drive state monitor can compare the current drive state to one or more switching standards stored in switching standards data store 210. As discussed, the request to change driving mode can come from the driver using one or more input devices 118, such as a physical button, switch, toggle, etc., or through interacting with a user interface, such as a touchscreen interface, heads-up display (HUD), or other graphical user interface available within the movable object. In some embodiments, the request may be made by the autonomous drive unit 124 based on data received from sensors 106. For example, the autonomous drive unit 124 may request the change to manual mode if there is interference in sensors 106 making autonomous driving unreliable, if particular weather or roadway conditions are detected, if the movable object is entering an area in which autonomous driving is prohibited, etc. Similarly, if the autonomous drive unit detects conditions where autonomous driving may improve safety, such as in stop-and-go traffic, no traffic, after a particular amount of manual driving time has been performed, etc., then the autonomous drive unit may request to change the driving mode to autonomous mode.

In some embodiments, the drive state monitor 206 may compare past driving states to the switching standards in addition to the current driving state. In various embodiments, the switching standards may include a maximum speed for a current location of the movable object, a current driving time, a terrain type, an intersection type, a current speed, a threshold distance from a nearest vehicle, or a current motion relative to a nearest vehicle. For example, changing driving modes may be prohibited if the movable object is exceeding the speed limit at its current location. Similarly, the driving mode may not be switched if the movable object is at a four-way stop, roundabout, or other intersection types. In some embodiments, the driving mode may not be changed if current traffic conditions are too dense or too sparse (e.g., if the current distance to a nearest vehicle is above or below a threshold), if the movable object is in the process of changing lanes, leading to lateral relative motion between the vehicles, or if the movable object is overtaking, or being overtaken by, another vehicle.

In some embodiments, the current driving state may be represented by a vector, tensor, or other data structure that represents the current state on multiple switching standards. Likewise, acceptable switching states may be represented by similarly formatted data structures. The drive state monitor 206 can compare the data structure representing the current driving state to one or more data structures representing switching states. If there is a match, then the driving mode may be changed. In some embodiments, the drive state monitor 206 can compare the data structure representing the current driving state to one or more data structures representing switching states that prohibit changing driving modes. If there is a match, then the driving mode may not be changed. In some embodiments, the drive mode controller 204 can return a message to the driver through driver communication module 222 indicating whether the driving mode can be changed, based on the comparison of the current driving state to the one or more switching states. The message can be, e.g., announced audibly to the driver, displayed on a console, dash, or other display within in the movable object, and/or communicated haptically, through the steering wheel, seat, or other portion of the vehicle interior with which the driver is in contact.

Once the drive mode controller 204 has determined that the driving mode can be changed, the drive mode controller can update the drive mode 214 to a pending switching state. The pending switching state may be a temporary driving mode during which the drive mode controller can ensure no change in driving state should cause the driving mode change to be stopped. For example, a cancel driving mode change instruction may be received, either through the driver manipulated one or more input devices, or by the autonomous drive unit detecting a change in conditions based on sensor data. In some embodiments, such a change in conditions that may generate a cancel driving mode change instruction may include a sudden change in speed of nearby vehicles, indicating a sudden slowdown or the end of a slowdown in traffic. The length of time during which the movable object is in the pending switching state may be fixed or may vary depending on current driving conditions. For example, the pending switching state may be a first length of time in low traffic conditions and a second, longer, length of time in high traffic conditions. In some embodiments, the pending switching state may last for the same amount of time when switching between any modes or may be different lengths of time when switching from autonomous to manual mode as compared to switching from manual to autonomous mode.

While the movable object is in pending switching state mode, both the autonomous drive unit 124 and the driver may provide driving inputs to the control manager 122. Control manager 122 may receive the driving inputs via autonomous input manager 216, which interfaces with autonomous drive unit 124, and driver input manager 218, which interfaces with the one or more input devices 118. In pending switching state mode, the inputs may be combined using control weights 220. The control weights 220 may be indexed to how long the movable object has been in the pending switching state. For example, the maximum weight value may be 1 and the minimum weight value may be 0. When the movable object first enters pending switching state mode from autonomous mode, the autonomous inputs may be weighted 1 and the manual inputs may be weighted 0, effectively keeping the movable object in autonomous mode. As the time spent in pending switching state mode continues, the weight applied to autonomous inputs may be reduced as the weight applied to the manual inputs increases, until at the end of the pending switching state, the weight applied to manual inputs is 1 and the weight applied to autonomous inputs is 0. Similarly, when switching from manual mode to autonomous mode, the above described weights may be reversed. In some embodiments, the control output may be obtained by summing the weighted inputs, or otherwise combining the weighted inputs into a single control output. At the end of the pending switching state, the drive mode controller 204 can update the driving mode to the new state. By combining the inputs in the above described manner, any sudden, unintentional inputs provided by the driver when first taking control of the movable object would be ignored or muted in favor of the autonomous inputs.

Figure 3:
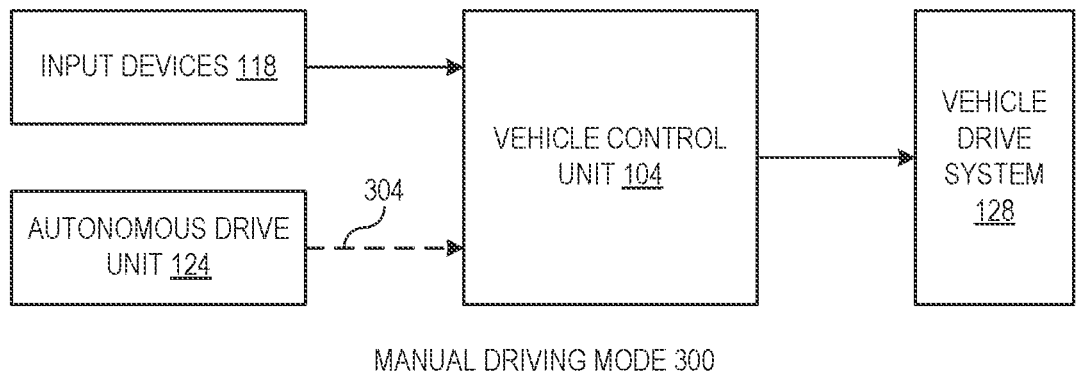
FIG. 3 illustrates an example of driving modes, in accordance with various embodiments of the present invention.
Figure 3:
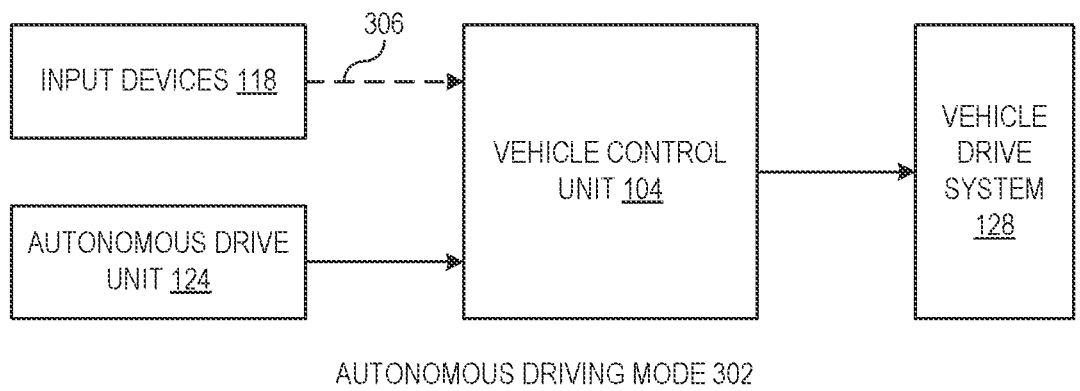

FIG. 3 illustrates an example of driving modes, in accordance with various embodiments of the present invention. As discussed above, in manual driving mode 300, the driver takes over full control of the vehicle, including the accelerator, steering, braking and other input devices. As shown at 304, in the manual driving mode 300 the inputs from the autonomous drive unit 124 are not received, or ignored, by the vehicle control unit 104. As such, all control inputs are provided by the driver. In some embodiments, while in manual mode, the autonomous drive unit may provide alerts to the driver, such as lane change warnings, proximity alerts, etc.

In an autonomous driving mode 302, the autonomous drive unit 124 can take over full control of the vehicle, including the accelerator, steering, braking and other functions of the vehicle drive system 128. As shown at 306, in autonomous driving mode, inputs may not be received from the driver via input devices 118, or the inputs may be ignored by the vehicle control unit 104. In some embodiments, if the driver does attempt to provide driving inputs via input devices 118, the vehicle control unit can override any instructions received by the autonomous drive unit 124. Alternatively, the vehicle control unit can determine whether the input provided by the driver is safe before executing the input of the driver either entirely or partially (e.g., by applying control weights to the input as if the vehicle were in the pending switching state mode described above). Alternatively, the vehicle control unit 104 can reject any inputs received from the driver via input devices 118.

Figure 4:
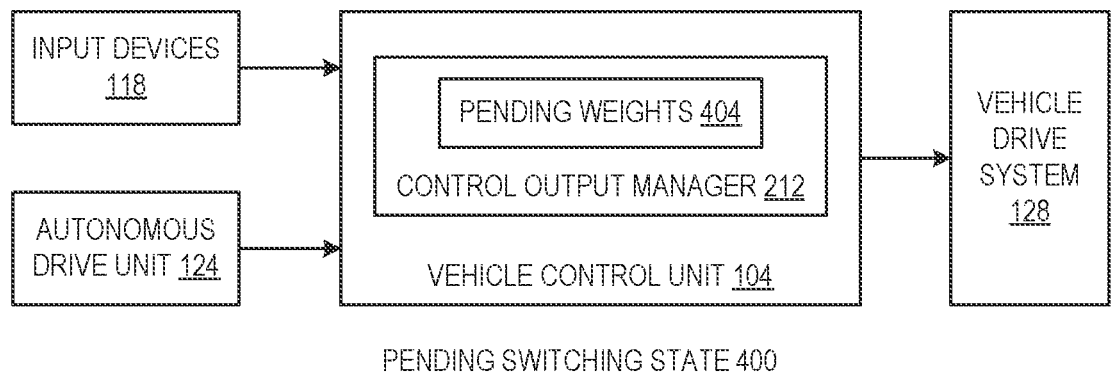
FIG. 4 illustrates an example of additional driving modes, in accordance with various embodiments of the present invention.
Figure 4:
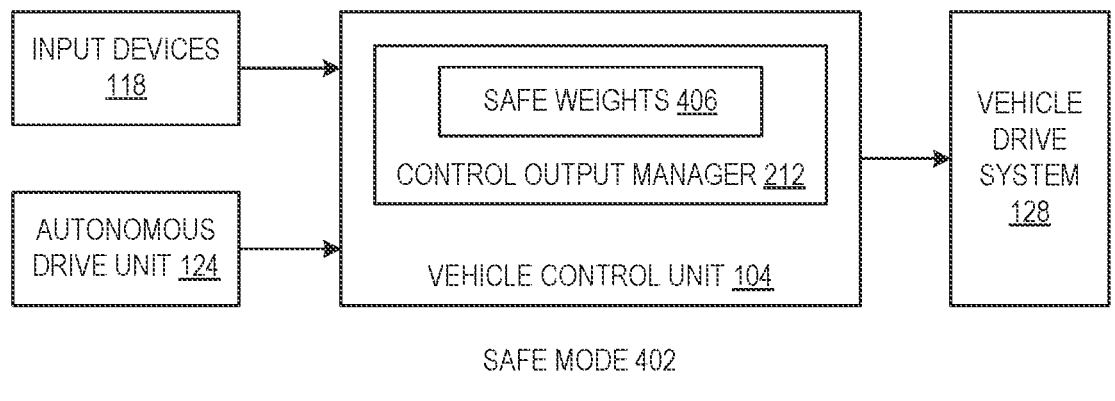

FIG. 4 illustrates an example of additional drive modes, in accordance with various embodiments of the present invention. As shown in FIG. 4, in pending switching state mode 400, inputs may be received from both the driver, via input devices 118, and the autonomous drive unit 124. While in pending switching state mode, the control output manager 212 can apply a set of pending weights 404 to the received inputs. As discussed above, the maximum weight value may be 1 and the minimum weight value may be 0. When the movable object first enters pending switching state mode from autonomous mode, the autonomous inputs may be weighted 1 and the manual inputs may be weighted 0, effectively keeping the movable object in autonomous mode. As the time spent in pending switching state mode continues, the weight applied to autonomous inputs may be reduced as the weight applied to the manual inputs increases, until at the end of the pending switching state, the weight applied to manual inputs is 1 and the weight applied to autonomous inputs is 0. Similarly, when switching from manual mode to autonomous mode, the above described weights may be reversed. At the end of the pending switching state, the drive mode controller 204 can update the driving mode to the new state. By combining the inputs in the above described manner, any sudden, unintentional inputs provided by the driver when first taking control of the movable object would be ignored or muted in favor of the autonomous inputs.

In some embodiments, the movable object may enter a safe mode. For example, if the driver no long provides any driving inputs via input devices 118 within a predetermined time and/or under a predetermined circumstance, the vehicle control unit 104 may cause the movable object to enter safe mode 402. Control output manager may apply a set of safe weights 406 to inputs received from the input devices 118 and autonomous drive unit 124. The safe weights may apply to particular types of control inputs. In some embodiments, the safe weights may be indexed to an amplitude of the control input value. For example, the safe weights may vary between 1 and 0 and may be defined by a function that limits the maximum control output to a particular "safe" value. This may include limiting the maximum acceleration, maximum speed, etc. of the movable object by manipulating the control output based on the safe weights 406. In some embodiments, the weights may cause all control inputs except for a subset of control inputs to be significantly reduced as control outputs. For example, based on the position of the movable object in a roadway, any control inputs other than those that would cause the movable object to pull over to the breakdown lane or shoulder of the road may have weights approaching 0 applied to them. While control inputs to cause the movable object to pull over may have weights approaching 1 applied to them.

Figure 5:
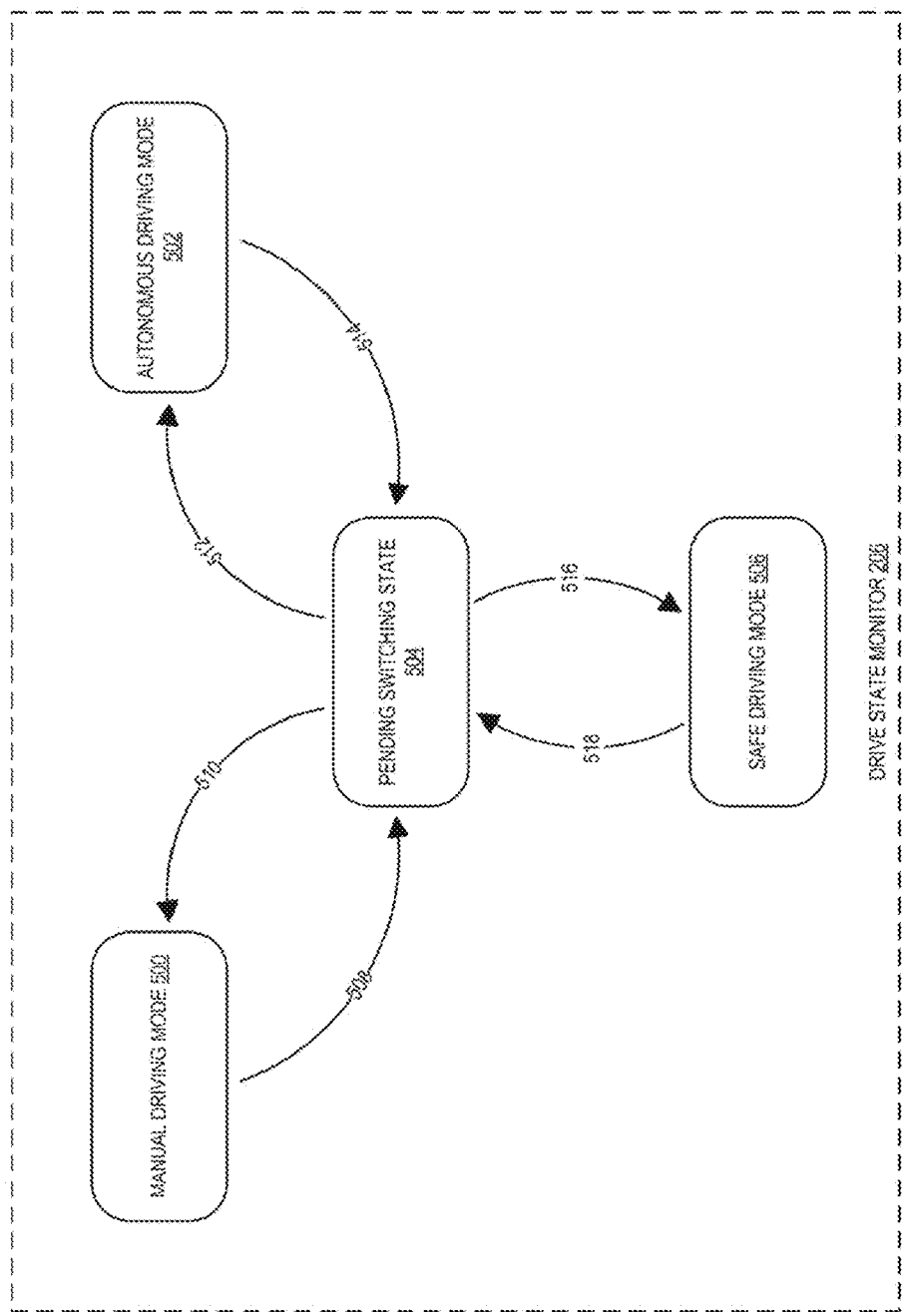
FIG. 5 illustrates an example of switching driving modes in a movable object environment, in accordance with various embodiments of the present invention.

FIG. 5 illustrates an example of switching drive modes in a movable object environment, in accordance with various embodiments of the present invention. As shown in FIG. 5, the drive state monitor 206 may control the current driving mode for the movable object among at least four driving modes: manual driving mode 500, autonomous driving mode 502, pending switching state mode 504, and safe driving mode 506. The conditions that cause the movable object to transition between each driving mode may vary depending on the current driving mode and the target driving mode to which the movable object is transitioning.

In some embodiments, when the movable object is in manual drive mode 500, a request may be received to change driving mode to autonomous driving mode. As discussed, such a request may be made by the driver through input devices 118 or automatically by the autonomous drive unit. Drive state monitor 206 can then determine whether the driving mode can be changed based on the current driving state. As discussed, the drive state monitor 206 can compare the current driving state to one or more switching standards, such as current speed and location standards (e.g., when the speed of the vehicle is not greater than 60 km/h in an urban area, or 100 km/h on a freeway, then switching may be carried out), or driving conditions (e.g., switching may be carried out after driving for more than one hour, or other time limit. Additional switching standards based on driving conditions, traffic conditions, etc., may include switching is prohibited when overtaking is in progress, or when being overtaken, or at particular intersections, such as four-way stops, or if the movable object is exceeding the speed limit at its current location. Similarly, terrain and/or roadway constraints may be defined. For example, switching may only be allowed on flat and straight roads, and/or when there is no vehicle within a predetermined threshold distance. In some embodiments, the threshold distance may vary depending on the current speed of the movable object.

As discussed, the vehicle obtains the current driving state through the sensors 106, which may include: the position, speed of the vehicle, acceleration, environmental information, driving behavior, traffic control information and so on. The drive state monitor 206 can compare the current driving state to the switching standards. If it meets the requirement, then at 508 the driving state can be updated to a pending switching state 504. In some embodiments, a notification can be provided to the driver indicating that the movable object is transitioning to the autonomous driving mode. In some embodiments, no confirmation of this notification is required from the driver while in manual driving mode 500. In some embodiments, the notification can be shown on a display, such as a console display, dashboard display, heads-up display, etc. The driver may dismiss the notification through a voice command, activating one of the plurality of input devices (such as touching a location on a touchscreen display, pressing a back button on the dash or console, etc.).

At this point, the autonomous drive mode can be activated (or if already activated, control input generated by the autonomous drive unit can be received by the control manager). The autonomous drive unit may operate in the background and its inputs combined with inputs received from the driver, as discussed above. In some embodiments, while in the pending switching state, the driver can receive a second notification, the second notification indicating the impending change in driving mode. In some embodiments, the driver can provide a confirmation of the second notification through one or more actions associated with the manual driving mode. For example, the driver may reposition the driver's seat using the plurality of input devices from a driving position to a reclined position. In some embodiments, the driver may provide confirmation via a voice command In the manual driving mode, no explicit confirmation from the driver may not cause the control manager to abort the change in driving modes. Instead, the absence of driving inputs, while in the manual driving mode and following the second notification, may be interpreted as confirmation of the driving mode change. If the driver cancels the change, the mode can revert back to the manual driving mode at 510. Additionally, or alternatively, the autonomous drive unit may cancel the change in driving mode due to a change in driving, traffic, environmental, or other conditions, as discussed, and the driving mode may likewise revert back to manual drive mode at 510. If, at the end of the pending switching state, the change has not been canceled, then at 512 the driving mode can be updated to autonomous drive mode 502.

In some embodiments, if after the driver is notified that the drive state monitor cannot switch driving modes to autonomous driving mode from manual driving mode, and no further inputs are received from the driver, the drive state monitor may force the movable object into a safe driving mode 506 at 516. As discussed, while in safe driving mode, the controls may be limited so as to reduce the speed of the movable object and/or move the object to a safe location before coming to a stop. In some embodiments, if the switching standard is not met and the driver fails to provide additional control inputs, the drive state monitor may force the movable object into a limited autonomous driving mode, which navigates the movable object to a safe location before coming to a stop. After the vehicle comes to a stop, the drive state monitor may change the movable object's driving state back to the pending switching state at 514 or 518, before determining how to proceed.

Unlike switching from manual driving mode to autonomous driving mode, which may be requested automatically by the autonomous drive unit, in some embodiments, the movable object can only be switched from autonomous mode to manual mode by an explicit request from the driver through input devices 118. Additionally, a plurality of confirmations may be required before switching driving modes. The confirmations required in the autonomous driving mode may be specific to the autonomous driving mode and used to confirm that the driver is ready to take control of the movable object.

In some embodiments, when the movable object is in autonomous driving mode 502, a request may be received to change driving mode to manual driving mode 500. As discussed, such a request may be made by the driver through input devices 118. Upon receiving a request to change modes from the autonomous driving mode, a message can be sent to the driver indicating that the request was received and requesting confirmation. In some embodiments, the message can be displayed on one or more displays in the movable object (e.g., a console display, dashboard display, heads-up display, etc.). Many vehicles provide messages to the driver intermittently based on driving state. When many messages are provided, it may become routine for the driver to dismiss the messages or acknowledge the messages without first determining what the message is actually indicating. As such, to ensure the driver is aware of the request to change driving modes, the message may indicate one or more of the input devices to be activated by the driver to confirm the request. The one or more input devices may be associated with a confirmation type selected by the control manager In some embodiments, the control manager may obtain all or a portion of the current driving state to select the confirmation type. For example, the control manager may obtain the current revolutions per minute (RPM) of the movable object and use this value as a seed to a pseudo-random number generator. Each confirmation type may be associated with a different range of possible output values of the pseudo-random number generator. Once the output value based on the current driving state has been obtained, the corresponding confirmation type may be determined. Each confirmation type may be associated with a different one or more input devices and/or actions to be performed by the driver using the one or more input devices. For example, the message may indicate a specific phrase to be said aloud by the driver to confirm the driving mode switch, or the message may indicate a subset of the input devices to be activated (e.g., pressed, tapped, or otherwise used by the driver) in a particular order. Because the confirmation type is selected pseudo-randomly, the confirmation does not become routine to the driver, reducing the likelihood of the driving mode change being confirmed without the driver being prepared to take over manual control.

After receiving the confirmation, drive state monitor 206 can then determine whether the driving mode can be changed based on the current driving state. The movable object obtains the current driving state through the sensors 106, which may include: the position, speed of the vehicle, acceleration, environmental information, driving behavior, traffic control information and so on. In some embodiments, the driving state may further include driver state, such as driver fatigue and readiness. Examples of driver state may include whether the driver is in the driver's seat and the position of the driver's seat (e.g., is it upright), is the driver's seatbelt fastened, etc.

If the driving state meets the switching standards, then the driving mode can be switched from autonomous driving mode 502 to pending switching state 504 at 514. As discussed, the drive state monitor 206 can compare the current driving state to one or more switching standards, such as driver fatigue detection is carried out by the vehicle and driver preparation detection is carried out by the vehicle. In some embodiments, the switching standards may also include driving conditions, terrain conditions, environmental conditions, etc., such as prohibiting mode changes while overtaking is in progress, at particular intersection types, when exceeding the speed limit at the current location, etc. In some embodiments, some locations may require either manual only or autonomous only driving modes. For example, a city center may include autonomous driving zones and manual driving zones. Once it is determined that the current driving state meets a switching standard, in some embodiments, a second confirmation prompt can be provided to the driver (e.g., through a graphical user interface displayed on a console, HUD, dash, or other screen in the movable object). If the driver fails to respond in a threshold amount of time to confirm the driving mode switch, then the driving mode can revert to autonomous driving mode at 512.

After responding within the threshold amount of time, the movable object may remain in the pending switching state. While in the pending switching state, one or more additional confirmations may be required. For example, a manual driving preparation warning may be provided to the driver. This warning may be provided as an audible warning to the driver to, e.g., adjust the seat to a driving position, fasten the safety belt, etc. In some embodiments, the safety belt is automatically tightened and the steering wheel vibrates to indicate that manual control is being transitioned to the driver. This second warning may also require confirmation from the driver within a threshold amount of time. In various embodiments, the confirmation may require a specific sequence of activations of the input devices. This sequence may be displayed to the driver and confirmation is only received once the input devices have been activated in the displayed sequence. For example, following the second warning, if the driver does not adjust their seat in the driving position, then the driving mode may revert to autonomous driving mode. Similarly, if the driver does not grip the steering wheel at specific locations (e.g., positions where the steering wheel is vibrating), then the driving mode may revert to autonomous driving mode. In some embodiments, the driver may be required to grip the steering wheel at a series of locations in succession (e.g., positions where the steering wheel is vibrating) to provide confirmation of driving readiness. In some embodiments, the driver may be required to press each pedal in a sequence displayed to audibly instructed to the driver to confirm the driver is seated in a position to reach the pedals and exert sufficient force on the pedals to safely operate them.

In some embodiments, the autonomous drive unit may continue operating after the vehicle has been transitioned to manual driving mode. The control manager may identify manual inputs that deviate from those generated by the autonomous drive unit by more than a threshold value. Such discrepancies may indicate that the driver is operating the vehicle in an unsafe manner. If the deviation continues for a configurable amount of time, then the control manager may automatically initiate a driving mode switch from manual driving mode to autonomous driving mode, as discussed above.

In some embodiments, after entering manual driving mode, if the driver does not provide any driving inputs within a predetermined amount of time and/or under a predetermined circumstance, control manager may automatically initiate a driving mode change from the manual driving mode to the safe driving mode. In some embodiments, sensors 106 and/or communication system 120 can receive driving state data from other movable objects and/or traffic infrastructure. For example, vehicles may communicate traffic data at their position to vehicles behind them on the roadway. As such, if there is an upcoming change in traffic (e.g., a sudden slow down due to an accident), then the control manager may refuse to change the driving mode of the movable object. Similarly, sensors incorporated into the roadway, light poles, signs, traffic lights, or other infrastructure, may likewise communicate driving state information to the movable object, which may be included in the decision as to whether to allow a change in driving state.

In some embodiments, after a driving mode switch has been refused, the driver may override the control manager by making a second driving mode switch request. In some embodiments, the second driving mode switch request may require additional credential information from the driver, such as verification of the driver's identity before the control manager can be overridden. Once confirmed, the driving mode can be changed to the requested driving mode. In some embodiments, overriding the refusal to change driving modes can force the movable object into the pending switching state for an unbounded amount of time. This effectively keeps the movable object in a state in which both manual and autonomous inputs can be received by the control manager In some embodiments, this forced mode may be associated with no weights, or may equally weight inputs from the driver and the autonomous drive unit.

Figure 6:
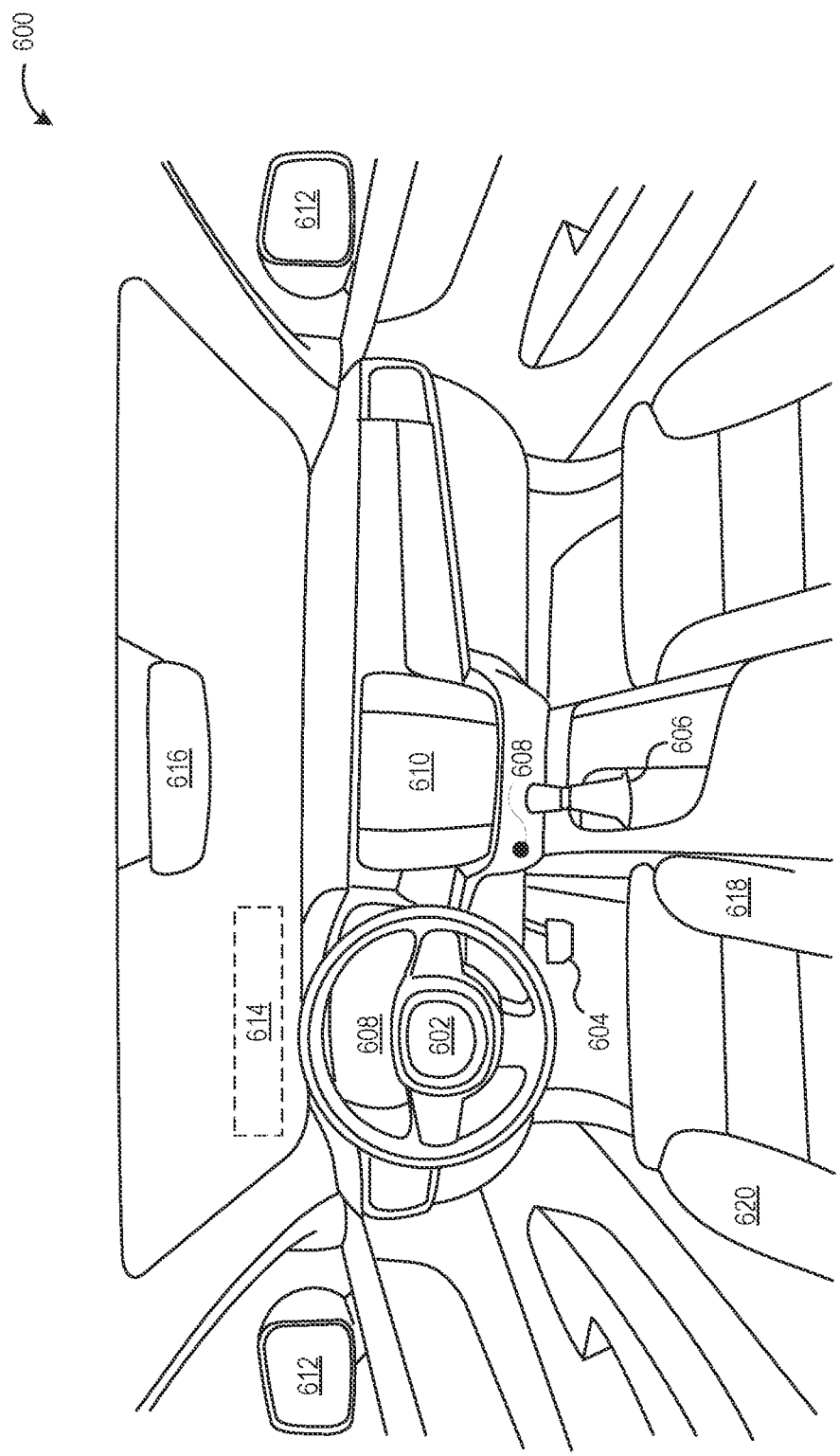
FIG. 6 illustrates example driver controls and feedback systems, in accordance with various embodiments of the present invention.

FIG. 6 illustrates example 600 driver controls and feedback systems, in accordance with various embodiments of the present invention. As shown in FIG. 6, the movable object may include various input devices 118, such as steering wheel 602, pedals 604, shifter 606, and one or more switches 608. In some embodiments, the movable object may include one or more displays, such as console display 610, dashboard display 608, and heads-up display 614. Each of these displays may be used to provide feedback to the driver. For example, an order of input devices to activate may be displayed on console display 610, once the driver activates the devices in the displayed order then the driving mode may be switched. In some embodiments, side mirrors 612 and rear-view mirror 616 may also include displays or may be configured to provide warnings or notifications to the driver. Additionally, the driver's seat may include one or more sensors 618-620, which may determine the position of the driver's seat and/or the position of the driver in the driver's seat. In some embodiments, sensors 618-620 may provide haptic feedback to the driver, such as by vibrating to alert the driver of an imminent change in driving mode.

Figure 7:
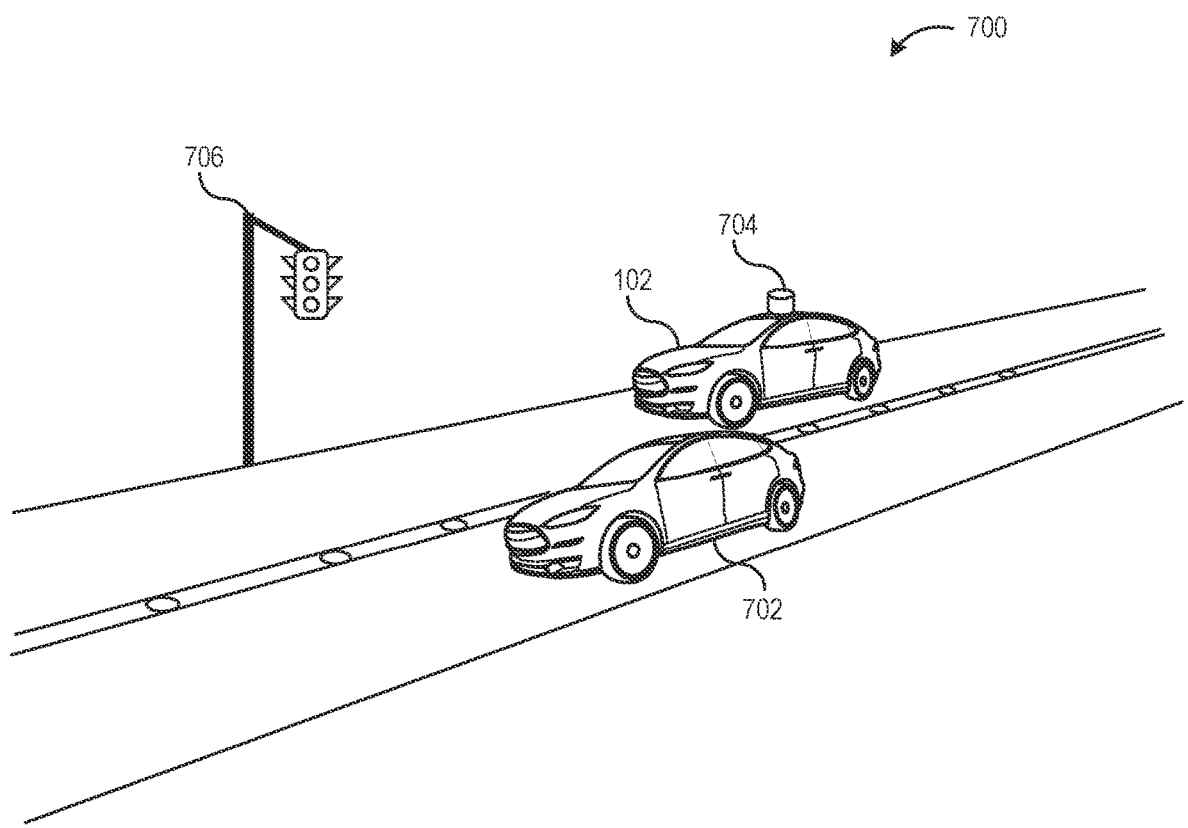
FIG. 7 illustrates an example driving state, in accordance with various embodiments of the present invention.

FIG. 7 illustrates an example driving state 700, in accordance with various embodiments of the present invention. As shown in FIG. 7, movable object 102 may obtain driving state using one or more sensors 106 coupled to the movable object. For example, the movable object may obtain sensor data related to other movable objects, such as vehicle 702, in the vicinity of movable object 104. As discussed, movable object 104 may include a LiDAR sensor 704, with which the movable object can object accurate information about the relative position of other objects in its vicinity. Using its sensors, the movable object may determine that its current driving state include another vehicle within a threshold distance of the movable object. Additionally, or alternatively, the movable object 104 may determine that it is being overtaken by vehicle 702, or that the movable object is overtaking vehicle 702. In some embodiments, vehicle 702 may communicate additional driving state to movable object 102 through communication system 120. For example, because vehicle 702 is farther ahead of movable object 102, its sensors may have identified an upcoming traffic change, roadway change, or other condition which movable object 102 can include in its current driving state. In some embodiments, traffic infrastructure, such as traffic light 706 may similarly provide additional driving state to the movable object 104.

Figure 8:
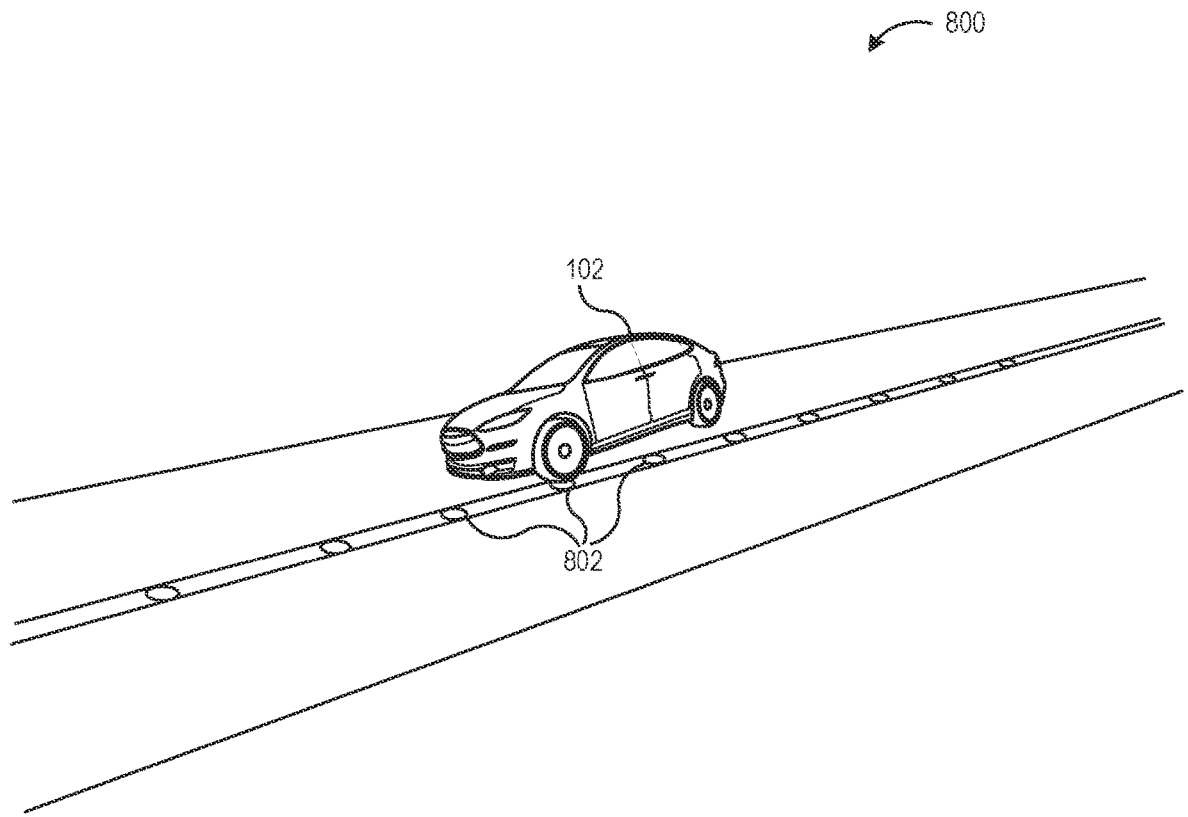
FIG. 8 illustrates another example driving state, in accordance with various embodiments of the present invention.

FIG. 8 illustrates another example driving state 800, in accordance with various embodiments of the present invention. Similar to the example shown in FIG. 7, movable object 102 may obtain driving state using one or more sensors 106 coupled to the movable object. For example, movable object 102 may detect that the movable object is changing lanes, e.g., using a lane detection warning system that can visually identify lane markings in image data captured by the sensors 106 coupled to the movable object. In some embodiments, the movable object may be prevented from changing driving modes while changing lanes. In some embodiments, sensor devices 802 integrated into the roadway (e.g., as reflectors, or otherwise incorporated into the road surface) may communicate driving state data to the movable object. The driving state data may include, e.g., a current speed limit associated with the location of the sensor device, upcoming traffic data for the road where the sensor device is located, the distance over which the road remains straight or a distance to the next curve in the roadway that exceeds a given angular value, or other driving state information. The movable object 102 can include the driving state information received from the sensor devices when determining whether to change driving modes.

Figure 9:
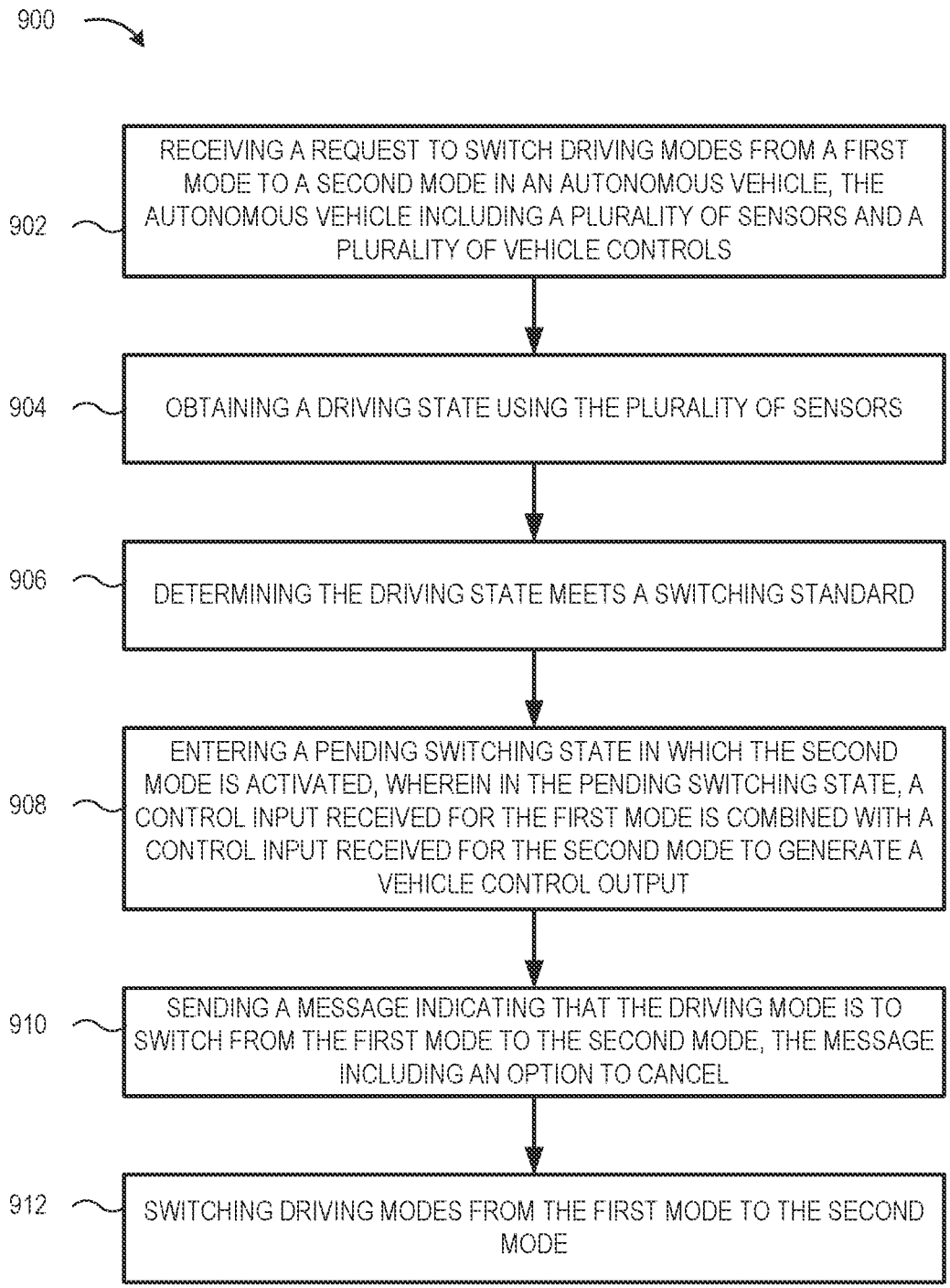
FIG. 9 shows a flowchart of a method of switching driving state in a movable object environment, in accordance with various embodiments of the present invention.

FIG. 9 shows a flowchart of a method 900 of switching driving state in a movable object environment, in accordance with various embodiments of the present invention. At 902, a request can be received to switch driving modes from a first mode to a second mode in an autonomous vehicle, the autonomous vehicle including a plurality of sensors and a plurality of vehicle controls. In some embodiments, the request to switch driving modes is generated after a driver has not provided any control input in at least a threshold amount of time, wherein the second mode is a safe mode that brings the autonomous vehicle to a safe stop. In some embodiments, the request to switch driving modes from a first mode to a second mode is generated by an input received through the plurality of vehicle controls.

At 904, a driving state is obtained using a plurality of sensors coupled to an autonomous vehicle. In some embodiments, the driving state can include one or more of a position, speed, acceleration, environmental information, driving information, or traffic information. In some embodiments, the plurality of sensors include a communication unit to receive sensor data from different autonomous vehicles or traffic infrastructure.

At 906, it is determined that the driving state meets a switching standard. In some embodiments, the switching standard comprises a plurality of positive switching standards and a plurality of negative switching standards. The switching standard includes one or more of: a maximum speed for a current environment, a driving time, a terrain type, an intersection type, a current speed, a threshold distance from a nearest vehicle, or a current motion relative to a nearest vehicle. In some embodiments, the switching standard is based on the sensor data received from the different autonomous vehicles or traffic infrastructure.

At 908, a pending switching state is entered in which the second mode is activated. In the pending switching state, a control input received for the first mode is combined with a control input received for the second mode to generate a vehicle control output. In some embodiments, combining the control input received for the first mode and the second mode can include determining an amplitude of the control input received for the second mode is larger than a threshold input value, applying a first weight value to the control input received for the second mode to obtain a first weighted control input, applying a second weight value to the control input received for the first mode, the second weight value being larger than the first weight value to obtain a second weighted control input, and generating the vehicle control output based on the first and second weighted control inputs.

At 910, a message is sent indicating that the driving mode is to switch from the first mode to the second mode, the message including an option to cancel. At 912, switching driving modes from the first mode to the second mode. In some embodiments, the first mode is a manual drive mode and the second mode is an autonomous drive mode, and wherein the request to switch driving modes from a first mode to a second mode is generated automatically by the vehicle control unit.

In some embodiments, the method may further include receiving a second request to switch driving modes from the second mode to the first mode, obtaining a second driving state, determining the second driving state does not meet a second switching standard, and returning a warning indicating the driving mode cannot be switched based on the second driving state. In some embodiments, the method may further include receiving a third request to switch driving modes from the second mode to the first mode in response to the warning, the third request overriding the warning, and switching driving modes from the second mode to the first mode.

Figure 10:
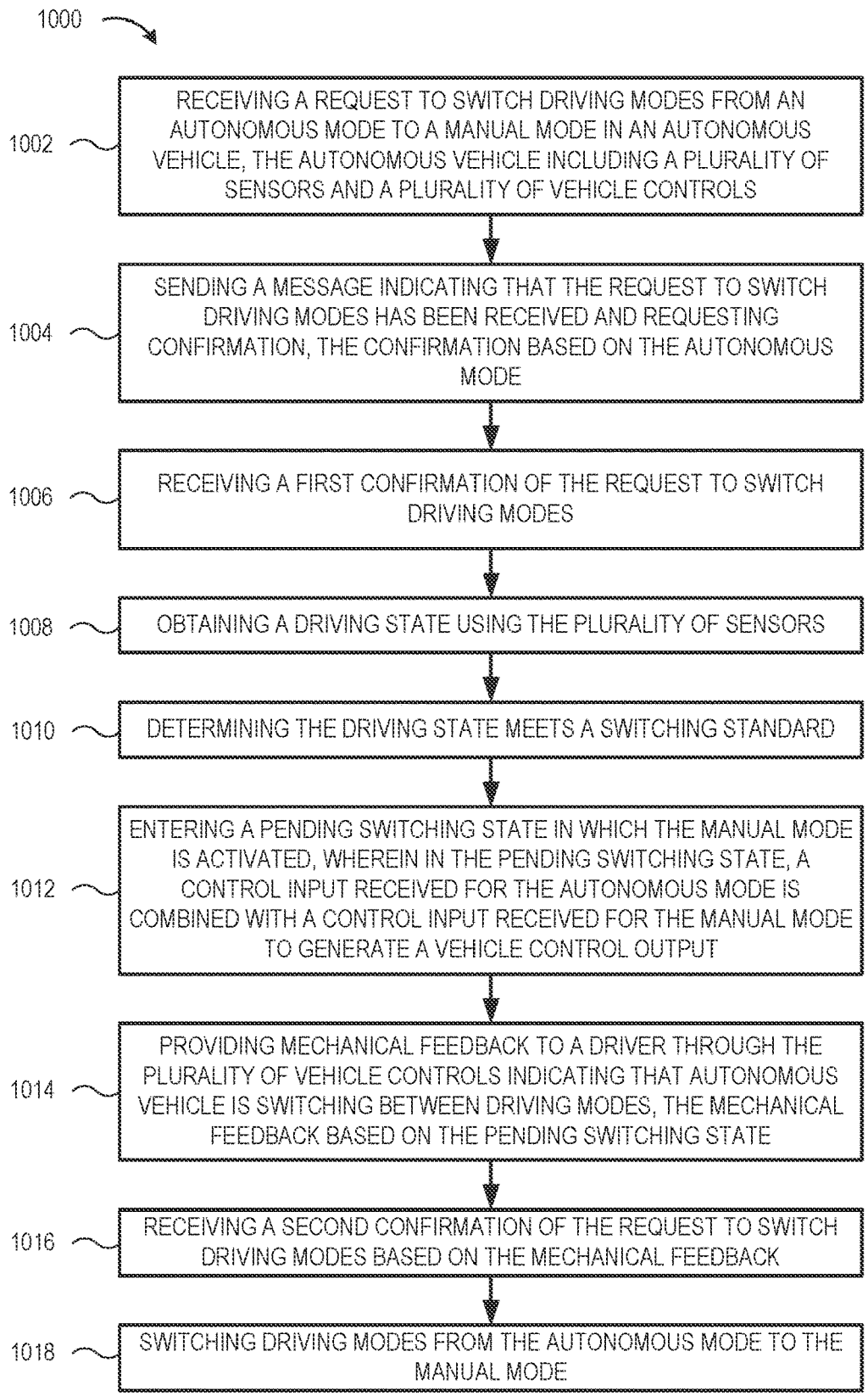
FIG. 10 shows a flowchart of a method of switching driving state in a movable object environment, in accordance with various embodiments of the present invention.

FIG. 10 shows a flowchart of a method 1000 of switching driving state in a movable object environment, in accordance with various embodiments of the present invention. At 1002, a request is received to switch driving modes from an autonomous mode to a manual mode in an autonomous vehicle, the autonomous vehicle including a plurality of sensors and a plurality of vehicle controls. In some embodiments, the request to switch driving modes from the autonomous mode to the manual mode is generated by an input received through the plurality of vehicle controls.

At 1004, sending a message indicating that the request to switch driving modes has been received and requesting confirmation, the confirmation based on the autonomous mode. In some embodiments, sending the message can include displaying the message on one or more displays in the autonomous vehicle and receiving the confirmation via the one or more displays. In some embodiments, a confirmation type associated with the confirmation can be selected by the movable object. The confirmation type can be selected from a plurality of confirmation types associated with the autonomous mode. The confirmation type can be displayed in the message displayed on the one or more displays, the confirmation type indicating one or more of the plurality of vehicle controls to be activated to provide the confirmation. In some embodiments, the confirmation type is selected pseudo-randomly based on the driving state. The one or more displays include a console display, a dashboard display, and a heads-up display.

At 1006, a first confirmation of the request to switch driving modes can be received. At 1008, a driving state can be obtained using the plurality of sensors. In some embodiments, the driving state includes one or more of a position, speed, acceleration, environmental information, driving information, or traffic information. In some embodiments, the driving state further includes driver fatigue information and driver preparation information. At 1010, determining the driving state meets a switching standard. In some embodiments, the switching standard can include one or more of a mode-restricted geographic region, a maximum speed for a current environment, a driving time, a terrain type, an intersection type, a current speed, a threshold distance from a nearest vehicle, or a current motion relative to a nearest vehicle.

At 1012, a pending switching state can be entered in which the manual mode is activated. In the pending switching state, a control input received for the autonomous mode is combined with a control input received for the manual mode to generate a vehicle control output. In some embodiments, combining the control inputs can include determining an amplitude of the control input received for the manual mode is larger than a threshold input value, applying a first weight value to the control input received for the manual mode to obtain a first weighted control input, applying a second weight value to the control input received for the autonomous mode, the second weight value being larger than the first weight value to obtain a second weighted control input, and generating the vehicle control output based on the first and second weighted control inputs.

At 1014, providing mechanical feedback to a driver through the plurality of vehicle controls indicating that autonomous vehicle is switching between driving modes, the mechanical feedback based on the pending switching state. In some embodiments, providing mechanical feedback can include selecting a subset of the plurality of vehicle controls associated with the pending switching state, and displaying an order of the subset of the plurality of vehicle controls to be activated to provide the second confirmation. In some embodiments, the mechanical feedback includes at least one of adjusting a seat to a driving mode position, tightening a safety belt, moving pedals into the driving mode position, changing window tint, or haptic feedback through a steering wheel.

At 1016, receiving a second confirmation of the request to switch driving modes based on the mechanical feedback. In some embodiments, receiving the second confirmation can include receiving an input from each vehicle control in the subset of the plurality of vehicle controls in the order displayed. At 1018, switching driving modes from the autonomous mode to the manual mode.

In some embodiments, the method may further include obtaining a new driving state using the plurality of sensors, detecting a mode switching state based on the new driving state, generating a second request to switch driving modes from the manual mode to the autonomous mode, and sending a second message indicating that the request to switch driving modes has been received, wherein in manual mode no confirmation is required.

In some embodiments, the method may further include monitoring, after switching driving modes, a plurality of manual control inputs received from the driver through the plurality of vehicle controls, determining the plurality of manual control inputs are to cause the autonomous vehicle to operate outside of safe operating parameters, and in response, switching driving modes from the manual mode to the autonomous mode.

In some embodiments, the method may further include after switching driving modes to the manual mode, determining a driver has not provided any control input in at least a threshold amount of time, and switching driving modes to a safe mode that brings the autonomous vehicle to a safe stop.

Figure 11:
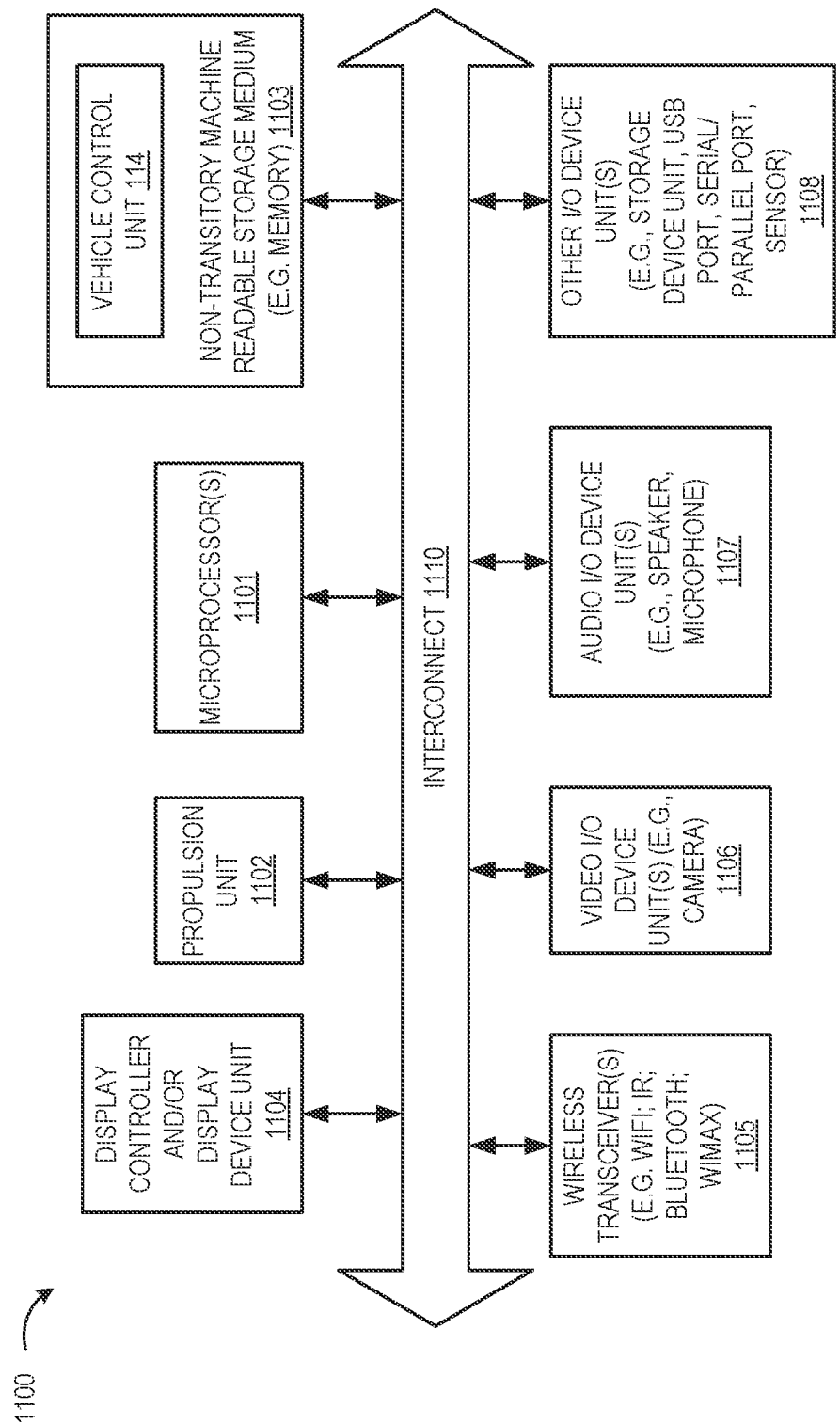
FIG. 11 is an exemplary illustration of a movable object, in accordance with various embodiments of the present invention.

FIG. 11 is an exemplary illustration of a computing device, in accordance with various embodiments of the present invention. The computing device 1100 is an electronic device including many different components. These components can be implemented as integrated circuits (ICs), discrete electronic devices, or other modules adapted to a circuit board such as a motherboard or add-in card of a computing system, or as components otherwise incorporated within a chassis of the computing system. In some embodiments, all or a portion of the components described with respect to FIG. 11 may be included in a computing device that is coupled to a movable object. In some embodiments, computing device 1100 may be a movable object. Note also that the computing device 1100 is intended to show a high-level view of many components of the computing system. However, it is to be understood that additional components may be present in certain implementations and furthermore, different arrangements of the components shown may occur in other implementations.

In one embodiment, the computing device 1100 includes one or more microprocessors 1101, propulsion unit 1102, non-transitory machine-readable storage medium 1103, and components 1104-1108 that are interconnected via a bus or an interconnect 1110. The one or more microprocessor 1101 represent one or more general-purpose microprocessors such as a central processing unit (CPU), graphics processing unit (GPU), general purpose graphics processing unit (GPGPU), or other processing device. More particularly, the microprocessor 1101 may be a complex instruction set computing (CISC) microprocessor, reduced instruction set computing (RISC) microprocessor, very long instruction word (VLIW) microprocessor, or microprocessor implementing other instruction sets, or microprocessors implementing a combination of instruction sets. Microprocessor 1101 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

The one or more microprocessors 1101 may communicate with non-transitory machine-readable storage medium 1103 (also called computer-readable storage medium), such as magnetic disks, optical disks, read only memory (ROM), flash memory devices, and phase change memory. The non-transitory machine-readable storage medium 1103 may store information, including sequences of instructions, such as computer programs, that are executed by the one or more microprocessors 1101, or any other device units. For example, executable code and/or data of a variety of operating systems, device drivers, firmware (e.g., input output basic system or BIOS), and/or applications can be loaded in the one or more microprocessors 1101 and executed by the one or more microprocessors 1101.

The non-transitory machine-readable storage medium 1103 may include logic to implement all or portions of the functionality described above with respect to at least the vehicle control unit 114 and its various components (e.g., control manager 122, autonomous drive unit 124, drive model controller 204, control output manager 212, autonomous input manager 216, driver input manager 218, driver communication module 318, etc.) which includes instructions and/or information to perform operations discussed herein above. The non-transitory machine-readable storage medium 1103 may also store computer program code, executable by the one or more microprocessor 1101, to perform operations discussed herein above in methods 900 and 1000 in accordance with various embodiments of the present invention.

The propulsion unit 1102 may include one or more devices or systems operable to generate forces for sustaining controlled movement of the computing device 1100. The propulsion unit 1102 may share or may each separately include or be operatively connected to a power source, such as a motor (e.g., an electric motor, hydraulic motor, pneumatic motor, etc.), an engine (e.g., an internal combustion engine, a turbine engine, etc.), a battery bank, etc., or combinations thereof. The propulsion unit 1102 may include one or more actuators to control various components of the movable object in response to instructions (e.g., electrical inputs, messages, signals, etc.) received from the vehicle control unit. For example, the actuators may regulate fluid flow, pressure, air flow and other aspects of the vehicle drive system 128 (e.g., braking system, steering system, etc.) by controlling various valves, flaps, etc. within the vehicle drive system. The propulsion unit 1102 may also include one or more rotary components connected to the power source and configured to participate in the generation of forces for sustaining controlled flight. For instance, rotary components may include rotors, propellers, blades, nozzles, etc., which may be driven on or by a shaft, axle, wheel, hydraulic system, pneumatic system, or other component or system configured to transfer power from the power source. The propulsion unit 1102 and/or rotary components may be adjustable with respect to each other and/or with respect to computing device 1100. The propulsion unit 1102 may be configured to propel computing device 1100 in one or more vertical and horizontal directions and to allow computing device 1100 to rotate about one or more axes. That is, the propulsion unit 1102 may be configured to provide lift and/or thrust for creating and maintaining translational and rotational movements of computing device 1100.

The computing device 1100 may further include display control and/or display device unit 1104, wireless transceiver(s) 1105, video I/O device unit(s) 1106, audio I/O device unit(s) 1107, and other I/O device units 1108 as illustrated. The wireless transceiver 1105 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof.

The video I/O device unit 1106 may include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips and conferencing. The video I/O device unit 1106 may be a 4K camera/camcorder in one embodiment.

An audio I/O device unit 1107 may include a speaker and/or a microphone to facilitate voice-enabled functions, such as voice recognition, voice replication, digital recording, and/or telephony functions. Other device units 1108 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. The device units 1108 may further include certain sensors coupled to the interconnect 1110 via a sensor hub (not shown), while other devices such as a thermal sensor, an altitude sensor, an accelerometer, and an ambient light sensor may be controlled by an embedded controller (not shown), dependent upon the specific configuration or design of the computing device 1100.

Many features of the present invention can be performed in, using, or with the assistance of hardware, software, firmware, or combinations thereof. Consequently, features of the present invention may be implemented using a processing system (e.g., including one or more processors). Exemplary processors can include, without limitation, one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

What is claimed is:

1. A vehicle control system, comprising:
a plurality of sensors coupled to an autonomous vehicle;
a plurality of vehicle controls in the autonomous vehicle;
a vehicle control unit in communication with the plurality of sensors and the plurality of vehicle controls, the vehicle control unit including at least one processor and a control manager, the control manager including instructions which, when executed by the processor, cause the control manager to:
receive a request to switch driving modes from a first mode to a second mode;
obtain a driving state using the plurality of sensors;
determine that the driving state meets a switching standard;
enter a pending switching state, the pending switching state in which the autonomous vehicle being a temporary driving mode between the first mode and the second mode, a length of time in the pending switching state varies depending on current driving conditions, wherein the length of time the pending switching state in smooth traffic conditions is shorter than that in congested traffic conditions, wherein in the pending switching state, a control input received for the first mode applied with a first weight value is combined with a control input received for the second mode applied with a second weight value to generate a vehicle control output to control one function of the autonomous vehicle;
send a message indicating that the driving mode is to switch from the first mode to the second mode, the message including an option to cancel, if a driver cancels change, then the driving mode reverts back to the first mode, if, at the end of the pending switching state, the change has not been canceled, then the driving mode is updated to the second mode; and
switch the driving modes from the temporary driving mode to the second mode,
wherein as time in the pending switching state continues, the first weight value decreases while the second weight value increases.

2. The system of claim 1, wherein the driving state includes one or more of a position, speed, acceleration, environmental information, driving information, or traffic information.

3. The system of claim 1, wherein the switching standard comprises a plurality of positive switching standards and a plurality of negative switching standards.

4. The system of claim 3, wherein the plurality of positive switching standards and the plurality of negative switching standards include at least one of:
a maximum speed for a current location;
a driving time;
a terrain type;
an intersection type;
a current speed;
a threshold distance from a nearest vehicle; or
a current motion relative to a nearest vehicle.

5. The system of claim 1, wherein the request to switch driving modes is generated after a driver has not provided any control input in at least a threshold amount of time, wherein the second mode is a safe mode that brings the autonomous vehicle to a safe stop.

6. The system of claim 1, wherein the plurality of sensors include a communication unit to receive sensor data from different autonomous vehicles or traffic infrastructure.

7. The system of claim 6, wherein the switching standard is based on the sensor data received from the different autonomous vehicles or traffic infrastructure.

8. A method for controlling an autonomous vehicle, comprising:
receiving a request to switch driving modes from a first mode to a second mode in an autonomous vehicle, the autonomous vehicle including a plurality of sensors and a plurality of vehicle controls;
obtaining a driving state using the plurality of sensors;

determining that the driving state meets a switching standard;

entering a pending switching state, the pending switching state in which the autonomous vehicle being a temporary driving mode between the first mode and the second mode, a length of time in the pending switching state varies depending on current driving conditions, wherein the length of time the pending switching state in smooth traffic conditions is shorter than that in congested traffic conditions, wherein in the pending switching state, a control input received for the first mode applied with a first weight value is combined with a control input received for the second mode applied with a second weight value to generate a vehicle control output to control one function of the autonomous vehicle;

sending a message indicating that the driving mode is to switch from the first mode to the second mode, the message including an option to cancel, if a driver cancels change, then the driving mode reverts back to the first mode, if, at the end of the pending switching state, the change has not been canceled, then the driving mode is updated to the second mode; and switching driving modes from the pending switching state temporary driving mode to the second mode, wherein as time in the pending switching state continues, the first weight value decreases while the second weight value increases.

9. The method of claim 8, wherein the first mode is a manual drive mode and the second mode is an autonomous drive mode, and wherein the request to switch driving modes from a first mode to a second mode is generated automatically.

10. The method of claim 8, wherein the request to switch driving modes from a first mode to a second mode is generated by an input received through the plurality of vehicle controls.

11. The method of claim 8, further comprising:
receiving a second request to switch driving modes from the second mode to the first mode;
obtaining a second driving state;
determining that the second driving state does not meet a second switching standard; and
returning a warning indicating the driving mode cannot be switched based on the second driving state.

12. The method of claim 11, further comprising:
receiving a third request to switch driving modes from the second mode to the first mode in response to the warning, the third request overriding the warning; and
switching driving modes from the second mode to the first mode.

13. A non-transitory computer readable storage medium including instructions stored thereon which, when executed by one or more processors, cause the one or more processors to:
receive a request to switch driving modes from a first mode to a second mode in an autonomous vehicle, the autonomous vehicle including a plurality of sensors and a plurality of vehicle controls;
obtain a driving state using the plurality of sensors;
determine that the driving state meets a switching standard;
enter a pending switching state, the pending switching state in which the autonomous vehicle being a temporary driving mode between the first mode and the second mode, a length of time in the pending switching state varies depending on current driving conditions, wherein the length of time the pending switching state in smooth traffic conditions is shorter than that in congested traffic conditions, wherein in the pending switching state, a control input received for the first mode applied with a first weight value is combined with a control input received for the second mode applied with a second weight value to generate a vehicle control output to control one function of the autonomous vehicle;

send a message indicating that the driving mode is to switch from the first mode to the second mode, the message including an option to cancel, if a driver cancels change, then the driving mode reverts back to the first mode, if, at the end of the pending switching state, the change has not been canceled, then the driving mode is updated to the second mode; and switch driving modes from the pending switching state temporary driving mode to the second mode, wherein as time in the pending switching state continues, the first weight value decreases while the second weight value increases.

14. The non-transitory computer readable storage medium of claim 13, wherein the driving state includes one or more of a position, speed, acceleration, environmental information, driving information, or traffic information.

15. The non-transitory computer readable storage medium of claim 13, wherein the switching standard comprises a plurality of positive switching standards and a plurality of negative switching standards.

16. The non-transitory computer readable storage medium of claim 15, wherein the plurality of positive switching standards and the plurality of negative switching standards include at least one of:
a maximum speed for a current environment;
a driving time;
a terrain type;
an intersection type;
a current speed;
a threshold distance from a nearest vehicle; or a current motion relative to a nearest vehicle.

17. The non-transitory computer readable storage medium of claim 13, wherein the plurality of sensors include a communication unit to receive sensor data from different autonomous vehicles or traffic infrastructure and wherein the switching standard is based on the sensor data received from the different autonomous vehicles or traffic infrastructure.

18. The non-transitory computer readable storage medium of claim 13, wherein the first mode is a manual drive mode and the second mode is an autonomous drive mode, and wherein the request to switch driving modes from a first mode to a second mode is generated automatically, and wherein the request to switch driving modes from a first mode to a second mode is generated by an input received through the plurality of vehicle controls.

19. The non-transitory computer readable storage medium of claim 13, wherein the instructions, when executed, further cause the one or more processors to:
receive a second request to switch driving modes from the second mode to the first mode;
obtain a second driving state;
determine that the second driving state does not meet a second switching standard;
return a warning indicating the driving mode cannot be switched based on the second driving state;
receive a third request to switch driving modes from the second mode to the first mode in response to the warning, the third request overriding the warning; and switching driving modes from the second mode to the first mode.

20. The system of claim 1, wherein to combine the control input received for the first mode with the control input received for the second mode to generate a vehicle control output, the instructions, when executed, further cause the one or more processors to:
- determine that an amplitude of the control input received for the second mode is larger than a threshold input value;
- apply a first weight value to the control input received for the second mode to obtain a first weighted control input;
- apply a second weight value to the control input received for the first mode, the second weight value being larger than the first weight value to obtain a second weighted control input; and
- generate the vehicle control output based on the first and second weighted control inputs.

* * * * *